United States Patent
Obrist

(10) Patent No.: US 11,105,525 B2
(45) Date of Patent: Aug. 31, 2021

(54) METHOD FOR HEATING OR COOLING ROOMS IN A BUILDING

(71) Applicant: OBLAMATIK AG, Chur (CH)

(72) Inventor: Roland Obrist, Scharans (CH)

(73) Assignee: OBLAMATIK AG, Chur (CH)

(*) Notice: Subject to any disclaimer, the term of this patent is extended or adjusted under 35 U.S.C. 154(b) by 214 days.

(21) Appl. No.: 16/461,227

(22) PCT Filed: Dec. 13, 2016

(86) PCT No.: PCT/EP2016/080777
§ 371 (c)(1),
(2) Date: May 15, 2019

(87) PCT Pub. No.: WO2018/108245
PCT Pub. Date: Jun. 21, 2018

(65) Prior Publication Data
US 2019/0277526 A1   Sep. 12, 2019

(51) Int. Cl.
*F24F 11/30* (2018.01)
*F24F 11/84* (2018.01)
(Continued)

(52) U.S. Cl.
CPC .......... *F24F 11/30* (2018.01); *F24D 19/1018* (2013.01); *F24F 3/065* (2013.01);
(Continued)

(58) Field of Classification Search
CPC .. F24F 11/30; F24F 11/84; F24F 11/64; F24F 11/65; F24F 11/67; F24F 3/065;
(Continued)

(56) References Cited

U.S. PATENT DOCUMENTS 4,215,408 A * 7/1980 Games ............... F24F 11/48
700/278
4,307,576 A * 12/1981 Takano .............. F25B 49/02
62/204
(Continued)

FOREIGN PATENT DOCUMENTS

DE   102004017593 B3   11/2005
DE   102009004319 A1    7/2010
(Continued)

OTHER PUBLICATIONS

International Search Report for corresponding PCT application No. PCT/EP2016/08077, dated Aug. 14, 2017.
(Continued)

*Primary Examiner* — Travis C Ruby
(74) *Attorney, Agent, or Firm* — Notaro, Michalos & Zaccaria P.C.

(57) ABSTRACT

A method for heating or cooling rooms in a building with a temperature-controlled system, the temperature-controlled system has a central heater or cooler with a run-around coil system having a supply line and a return line, a central circulation pump for circulating a temperature-control fluid in the run-around coil system, at least two heat exchanger devices that thermally supply one room of the building and are connected to the supply line and the return line of the run-around coil system, one valve with an actuator for each heat exchanger device, one room temperature sensor for each thermally supplied room, and a central open- and closed-loop control unit that is connected to the actuators of the valves and to the room temperature sensors. The method serves to bring about, in the thermally supplied rooms, a temperature transition from a starting state to an end state, with corresponding room temperature setpoint values.

13 Claims, 1 Drawing Sheet

(51) Int. Cl.

| | | |
|---|---|---|
| *F24F 11/64* | (2018.01) | |
| *F24F 11/65* | (2018.01) | |
| *F24F 11/67* | (2018.01) | |
| *F24D 19/10* | (2006.01) | |
| *F24F 3/06* | (2006.01) | |
| *F24F 3/08* | (2006.01) | |
| *G05D 23/19* | (2006.01) | |
| *F24F 110/10* | (2018.01) | |

(52) U.S. Cl.
CPC ............... *F24F 3/08* (2013.01); *F24F 11/64* (2018.01); *F24F 11/65* (2018.01); *F24F 11/67* (2018.01); *F24F 11/84* (2018.01); *G05D 23/1934* (2013.01); *F24D 2220/042* (2013.01); *F24F 2110/10* (2018.01)

(58) Field of Classification Search
CPC ..... F24F 3/08; F24F 2110/10; F24D 19/1018; F24D 19/0075; F24D 2220/042; F24D 2220/0257; F24D 2220/0271; G05D 23/1934
See application file for complete search history.

(56) References Cited

U.S. PATENT DOCUMENTS

| | | | | |
|---|---|---|---|---|
| 4,784,212 A | * | 11/1988 | Brimer | G05D 23/1917 165/240 |
| 6,415,619 B1 | * | 7/2002 | Bash | F25B 5/02 62/228.4 |
| 10,625,561 B2 | * | 4/2020 | Neu | F25D 11/022 |
| 2011/0209490 A1 | * | 9/2011 | Mijanovic | F25B 5/02 62/190 |
| 2015/0114596 A1 | * | 4/2015 | Rohde | F24F 13/10 165/59 |
| 2015/0136378 A1 | * | 5/2015 | Maeda | F24F 11/70 165/237 |
| 2016/0025356 A1 | * | 1/2016 | Obrist | F24F 11/83 165/218 |
| 2016/0238268 A1 | * | 8/2016 | Nishimura | F24F 3/065 |
| 2016/0245569 A1 | * | 8/2016 | Unezaki | G05D 23/1932 |

FOREIGN PATENT DOCUMENTS

| | | |
|---|---|---|
| DE | 102014103668 A1 | 2/2015 |
| DE | 102014102275 A1 | 8/2015 |
| EP | 3034955 A1 | 6/2016 |
| WO | 2009072759 A2 | 6/2009 |
| WO | 2012146323 A2 | 11/2012 |

OTHER PUBLICATIONS

International Preliminary Report on Patentability and Written Opinion for corresponding PCT application No. PCT/EP2016/080777, dated Jun. 18, 2019.

* cited by examiner

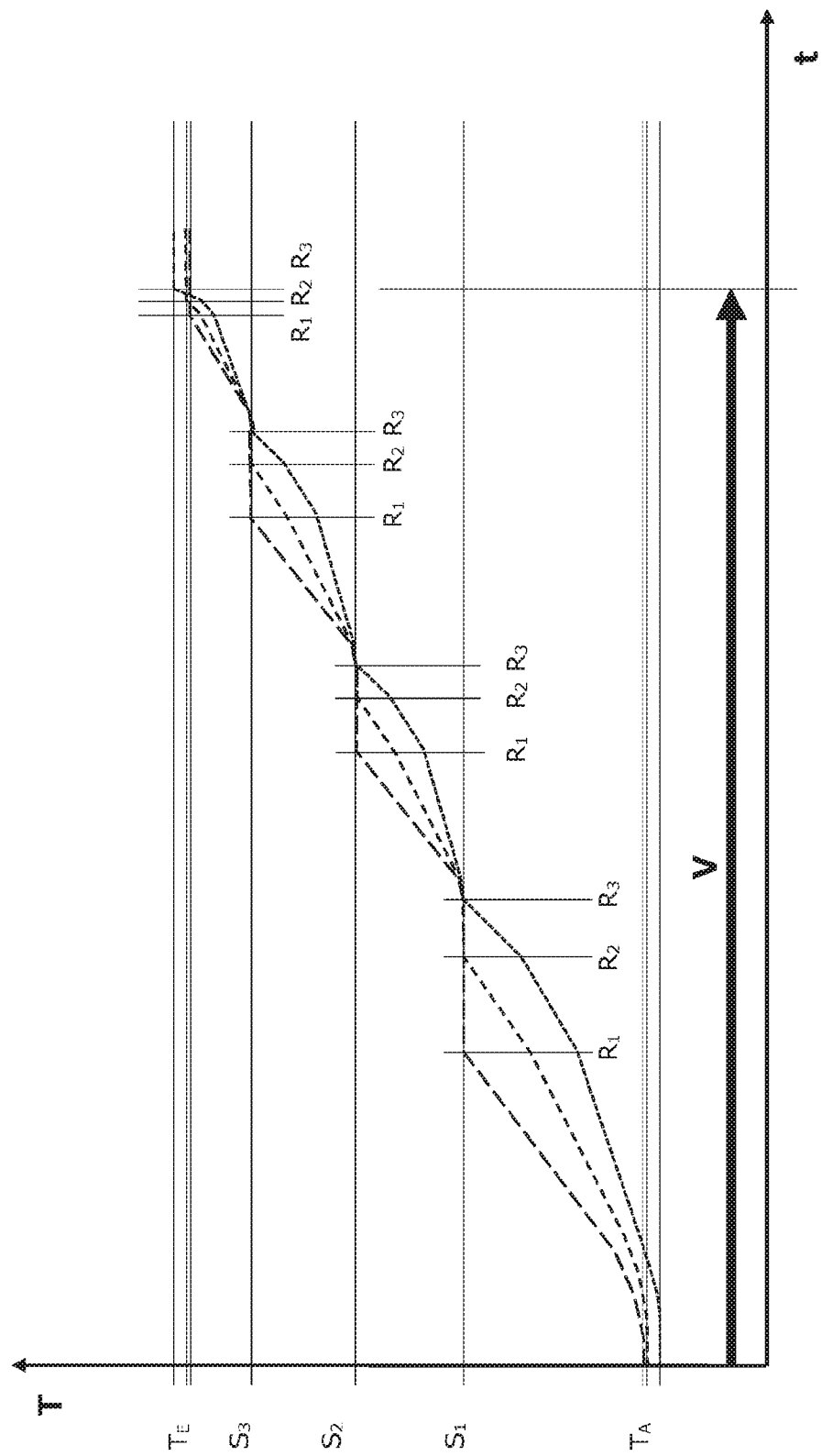

METHOD FOR HEATING OR COOLING ROOMS IN A BUILDING

The invention relates to a method for heating or cooling rooms in a building using a temperature-control system, i.e., a heating system or cooling system, which supplies multiple rooms in parallel, each having heat exchanger units connected to the feed and return lines, with a temperature-control fluid via a combined circulation system operated using a central circulation pump. It is to be ensured in this case that all heat exchanger units in rooms in a building are sufficiently thermally supplied, so that in particular when carrying out a temperature transition, i.e., during heating or cooling, the temperature difference between the room reacting fastest and the room reacting slowest is kept as small as possible.

Theoretically, such a temperature transition should not represent a problem if the overall system is hydraulically balanced with all heat exchangers and connecting lines. A hydraulic balance means that the flow rate through each individual heat exchanger is limited to the provided correct amount by limitable return screw connections or limitable thermostat valves, i.e., a uniform distribution of the temperature-control fluid in all temperature-control circuits is effectuated by prior settings adapted to one another. Without hydraulic balancing, because of the differing flow resistance in the line strands, a thermal oversupply occurs in rooms close to the circulation pump or the heat generator or cold generator, and a thermal undersupply occurs in more remote rooms. The temperature-control circuits of rooms located closer have to be limited in the flow rate thereof for the hydraulic balancing because of the lower flow resistance. Optimum fine tuning of an overall system requires a large amount of detailed knowledge and computations using a computation model, which is also often difficult to carry out in practice because of a lack of data.

The problem with very remote rooms, which have poor thermal supply and inadequate hydraulic balancing, is often displayed in large buildings having many rooms or apartments. The disadvantageous effect is particularly obvious, for example, in buildings such as schoolhouses or office and administration buildings, in which the temperature is reduced every evening to save energy. After the night reduction, however, all rooms are to be heated as rapidly as possible (for example, within 1-2 hours) back to their higher target temperature the next morning by switching over to the comfort operating mode. It frequently occurs in this case that very remote rooms remain cold longer because of an excessively low flow rate quantity in the heating elements and only slowly rise to the temperature, while rooms in the vicinity of the boiler become warm very rapidly. The problem and options for correcting deficient hydraulic balancing have already been dealt with in various ways in the prior art.

Document DE 10 2004 017 593 B3 relates to a cooling and/or heating device and discloses a schematic circuit diagram of a heating device in a building consisting of multiple floors each having multiple heating elements. A valve actuatable via a servomotor by a control unit for setting and/or regulating the fluid volume flow is introduced into the feed line of each heating element. The control unit has a control loop for regulating the hydraulic balancing of the circuits, wherein the control loop for the hydraulic balancing is formed using temperature sensors on the feed and return sides of each heating element, and wherein each heating element is regulated by means of the valves to a target temperature difference, which is to correspond to a specific volume flow in the sense of hydraulic balancing. The setting procedure of the hydraulic balancing takes place in chronological steps, i.e., in a gradual system balancing to avoid an overshoot of the system. A further control loop, for the regulation of the individual room temperatures to the desired target value, is overlaid on this control loop in the control unit.

Document DE 10 2009 004 319 A1 proposes, proceeding from the problem of thermostat valves, which are not always satisfactory and a static preset, a temperature-based solution similar with respect to control technology to document DE 10 2004 017 593 B3 for operating a heating or cooling system to effectuate additional dynamic hydraulic balancing. This method uses either only the return temperature (which is not supposed to exceed a maximum value) or the difference between feed and return temperature to carry out the hydraulic balancing and/or to regulate the volume flow through the individual heat exchangers or heating elements (by means of flow valve and expansion element and additional actuator, which is controlled by an associated controller). Moreover, the signal of a room temperature sensor is also detected, which also results in a regulating difference upon comparison to the room temperature target value, which is overlaid with the other signal in the regulating and control unit, and the actuator is controlled using the combined regulator output variable.

A method for automated hydraulic balancing of the heating system is proposed in EP 3 034 955 A1, in which the heat consumer having the lowest return temperature is determined. Temperature sensors in the return are thus presumed. The volume flow of the heat consumer supplied worst (having the lowest volume flow) is limited little or not at all. The volume flow for the other heat consumers is adapted (i.e., reduced) on the basis of the return temperatures thereof by a regulating and/or control unit via regulating valves so that as a consequence all return temperatures are balanced with one another and are in a predefinable range (and the overall system together with the corresponding regulating valve settings is hydraulically balanced).

The method described in WO 2009/072759 A2 for regulating a heating system is similar to the preceding one and preferably functions in such a way that the ratio of the degrees of opening of the respective room valves is computed and set by the system regulator so that the degree of opening of the room valve, the return of which takes the longest after the start of the system to come to a specific temperature (referred to as "arrival time") is completely opened, while the degrees of opening of the other room valves are proportionally reduced in relation to the maximum degree of opening to the extent by which the "arrival times" thereof were shorter in relation to the longest "arrival time". The return temperatures and the time curve thereof are also used here as a criterion for the setting of the regulating valves.

In the procedure for automatic hydraulic balancing of heating elements described in WO 2012/146323 A2, firstly a house is permitted to cool down to determine hydraulically undersupplied heating elements. After the heating element control valves have been closed for multiple hours, the control valves controlled by servomotors are slowly ramped up in small valve stroke steps in synchronization by slight partial opening in fractions of the maximum stroke. This is performed in time intervals, and in each case the change in the room temperatures is tracked in a central control unit. With the aid of this method, the temperature in the rooms of a house is gradually increased and it is determined in which room of a house a further increase of the temperature is achievable not at all or only inadequately by further opening of the control valves from a specific time interval. The corresponding control valve is then completely opened. The other control valves are individually only further opened in valve stroke steps or possibly partially closed again from the relevant time interval until the target temperature is reached and measured at the respective room thermostats. The position of each servomotor at the target temperature is defined as the maximum open position for the respective control valve and corresponds to a hydraulically balanced setting. In normal heating operation regulated by the room thermostats, the servomotors respectively actuating drives are then only moved between the closed position and the respective maximally open position. Therefore, in the final analysis, a ratio setting of the maximum valve strokes is used similarly as in the previously cited document.

Document DE 10 2014 103 668 A1 especially relates to the heating phase before the stationary operation, i.e., carrying out a temperature transition using a temperature-control system, for example, after the switching on or after the switching over to a different operating mode, in which differences because of poor hydraulic balancing stand out particularly strongly. Since the present invention also relates to such transition phases, DE 10 2014 103 668 A1 can be considered to be the closest prior art.

According to the method described in DE 10 2014 103 668 A1, in a heating and/or cooling system having valves settable via servomotors, the hydraulic balancing is performed during the startup (heating or cooling phase) by the central regulating unit progressively (dynamically) in dependence on the hydraulically most unfavorable valve, specifically in such a way that the temperature transition can be carried out relatively rapidly and practically simultaneously for all rooms even using a pipe network structure which is unknown and unbalanced. The hydraulically most unfavorable valve (having the associated heating element) is defined in this case as the one which has to be open farthest to maintain the target temperature of the corresponding room or to reach a desired temperature, or that of the hydraulically most unfavorable room, which heats up slowest at equal valve stroke. The method of DE 10 2014 103 668 A1 is to be divided into time intervals of a length of, for example, 10-20 minutes each. At the beginning of the heating phase, for the first time interval all valves are opened equally, for example, 100% (during a start-up) or less (for example, 15% during a changeover). At the very beginning, the system hydraulics are thus not balanced, whereby the hydraulically most unfavorable valve is established at the end of the first time interval, the valve stroke of which is left at 100% or is set to 100%. All other valves are limited in the stroke thereof and are each set to new values for the next and the following time intervals, and this is done individually according to an algorithm, which determines the individual heating components achieved in each room up to that point after every time interval and computes new percentage stroke limiting values for the next time interval therefrom. A heating component of a room is understood in this case as the component reached of the temperature increase (temperature actual value minus initial room temperature) in relation to the difference between the desired temperature target value and the initial room temperature. The heating component achieved in a single time interval is also incorporated in the calculation, and the stroke limits are computed in relation to the entirely open hydraulically most unfavorable valve and the present heating component of the most unfavorable room in such a way that the temperature target values are achieved as simultaneously as possible in all rooms. This procedure is repeated until the heating phase ends and/or the temperature actual values have reached the associated target values, wherein the rooms are heated at different strengths in the meantime as observed in individual time intervals. After reaching the temperature target values, the stationary regulating phase follows.

The object of the present invention is to provide an alternative method from the prior art for heating or cooling rooms in a building.

This object is achieved by a method having the features of claim 1.

In the method according to claim 1 for heating or cooling rooms in a building using a temperature-control system, the temperature-control system comprises:

a) a central heat generator or cold generator having a combined circulation system having feed and return lines;
b) a central circulating pump for the circulation of a temperature-control fluid in the combined circulation system;
c) at least two heat exchanger units, which each thermally supply one room of the building, and which are each connected to the feed and return lines of the combined circulation system;
d) one valve having actuating drive per heat exchanger unit;
e) one room temperature sensor per thermally supplied room; and
f) a central control and regulating unit, which is connected to the actuating drives of the valves and to the room temperature sensors.

With the heat exchanger units thus connected (which will be explained in greater detail hereafter), a combined circulation system results having corresponding parallel temperature-control circuits. The valves can be arranged either directly at the respective heat exchanger unit or in the associated temperature-control circuit. The actuating drive is, for example, a servomotor or an actuator having an expansion element. The expansion element is, for example, a wax expansion element. The room temperature sensors measure the temperature of the fluid (for example, air) located in the respective room. The method according to the invention only relates to rooms in a building supplied by the temperature-control system.

With the heating or cooling, a temperature transition is completed in the thermally supplied rooms in the building from a starting state to an end state different from the starting state having corresponding room temperature target values. During the temperature transition, the invention proceeds according to at least two preselected temperature stages lying between the starting state and the end state according to the following algorithm:

i) firstly all valves are completely opened by the central control and regulating unit;
ii) as soon the temperature reported by the corresponding room temperature sensor has reached a first temperature stage in a room, the relevant valve is completely closed;
iii) as soon as this first temperature stage is also reached in a next room, this valve is also completely closed;
iv) the procedure is continued with each further room until the first temperature stage is also reached in a last room;
v) all valves are then completely opened again until a second temperature stage is reached in a room, whereupon the relevant valve is completely closed, and the same procedure is used until this second temperature stage is also reached in a last room;
vi) all valves are completely opened again, and the algorithm is continued until all thermally supplied rooms have reached their room temperature target value;
vii) after reaching a room temperature target value, a regulating phase follows, in which the temperature in the relevant room is maintained by the central control and regulating unit at an end temperature level corresponding to the room temperature target value.

The algorithm comprises at least one further temperature stage under vi) if more than two temperature stages were preselected.

Preferred embodiments of the method according to the invention result from the dependent claims.

Advantages of the method according to the invention comprise:
- simpler algorithm than DE 10 2014 103 668 A1
- also functions with unknown an unbalanced pipe network structure
- return temperature and volume flow measurements not required
- computations of the hydraulics not required
- no computation and setting of partial valve strokes
- independent of time measurements or time intervals The temperature-control system of the present method is preferably a heating system and/or a cooling system. This thus means: either a heating system, or a cooling system, or (with the "and" of "and/or") a heating/cooling system, which is usable as a combination system for both. Whether the temperature-control system is used for heating or cooling is dependent on whether the temperature-control fluid in the combined circulation system is above or below the room temperature at its feed temperature. Because of the physical principle of the heat flow from warm to cold, the inherent condition has to be met for heating the rooms that the feed temperature of the temperature-control fluid is higher than the room temperature target value to be reached. For cooling, a feed temperature is required which is lower than the desired room temperature target value. The methods for heating and cooling function similarly in principle, but with inverted signs. The method according to the invention presented here is applicable for both.

The heat is exchanged with the rooms, i.e., with the fluid located in the rooms, via one heat exchanger unit per thermally supplied room. A heat exchanger unit comprises at least one heat exchanger. Two or more heat exchangers can also be used and can be connected in series or in parallel in the heat exchanger unit of a thermally supplied room in the scope of the present invention; in any case, the heat exchangers of one room are jointly supplied via precisely one feed fitting and a valve having actuating drive in each case. A heat exchanger is understood in the context of the present invention as a temperature control element through which a temperature-control fluid can flow and which is used for heating and/or cooling the fluid (for example, air) located in the room.

The heat exchangers are preferably selected from heating elements and/or cooling elements, which are preferably attached to the wall, in the floor, or to the ceiling of a room but could also be freestanding. Various geometries are possible for a heat exchanger. A heat exchanger can also be divided. Particularly preferred heat exchangers are radiators and underfloor heating systems.

Independently of the precise designation, any heat exchanger can be used in principle for heating or cooling, depending on the relationship of feed temperature to room temperature, as explained above.

The temperature-control fluid is a suitable heat carrier medium. A preferred heat carrier medium is water, as hot water or cold water. The temperature-control fluid is brought to the feed temperature suitable for heating or cooling by the central heat generator or cold generator. A heating/cooling combination system preferably operates without replacing the temperature-control fluid, i.e., preferably the feed temperature is merely adapted accordingly to the purpose using the same temperature-control fluid. For lower temperatures, a coolant or a coolant liquid having a lower freezing point is preferred, for example, a water-glycol mixture. The temperature-control fluid can moreover contain additives, for example, inhibitors against corrosion.

At least three rooms of the building are preferably thermally supplied by heat exchanger units.

The building, which comprises the rooms having the heat exchanger units, can be stationary or mobile. Preferred stationary buildings have many spaces or rooms or apartments to be thermally supplied. These are possibly buildings having a night reduction of the temperature, where the method according to the invention can advantageously be applied during the morning heating. Vice versa, in the case of a cooling system, the building can also be a warehouse or refrigeration building for food or other perishable goods. Instead of air, inert gases such as nitrogen or carbon dioxide could also come into consideration here as fluids located in the rooms. In the broadest sense, a liquid would also be conceivable in special cases as the room fluid, and a pipe loop as the heat exchanger design matching thereto, for example.

Mobile buildings are also to be understood in the scope of this invention as vehicles, on land, on water, and in the air, which can be divided into multiple rooms or cabins.

The algorithm of the method according to the invention preferably comprises at least three preselected temperature stages between the starting state and the end state different therefrom. A constant step size is preferably selected between the temperature stages. The step size is particularly preferably in the range of 0.1 to 1.0° C., very particularly preferably 0.5° C.

A special characteristic of the method according to the invention is that a next temperature stage in the algorithm is first engaged in each case when a specific temperature stage has been reached in all thermally supplied rooms. In contrast, the individual room temperatures in the starting state and/or in the end state different therefrom can be individually different.

It is also to be noted at this point that there can also be rooms in a building which are not provided for temperature control, and which are not supplied by the temperature-control system. As noted, the method according to the invention only relates to the rooms of a building supplied by the temperature-control system.

The invention will be explained by way of example and in a nonrestrictive manner on the basis of a schematically shown curve in FIG. 1.

FIG. 1 shows the temperature curve in three rooms during a temperature transition according to the method according to the invention.

In this example, a heating procedure is shown in a temperature (T)/time (t) diagram. The method V according to the invention begins in a starting state $T_A$, in which the temperature in the three rooms can be different or identical, as shown. With the opening of the three valves, the temperature-control fluid, the monitored feed temperature of which is higher than the room temperature to be reached in the end state $T_E$, begins to flow to the three heat exchanger units, and it flows through the heat exchangers. After a start-up time, the room temperatures begin to rise at different speeds. The room most remote from the heat generator having the longest line and the greatest flow resistance heats up most slowly. Three preselected temperature stages $S_1$, $S_2$, and $S_3$ are defined between the starting state $T_A$ and the end state $T_E$ in the illustrated example. As soon the fastest heating room reaches the stage $S_1$ at the point $R_1$, the associated valve is completely closed. A possible slight overshoot of the room temperature was neglected in the graphic illustration. In the two other temperature-control circuits, the temperature-control fluid flows somewhat faster from $R_1$ (and these room temperatures rise somewhat faster), because the pressure of the central circulating pump is now available to them which had previously been distributed to all three temperature-control circuits. As soon as the temperature of the second room has also reached the temperature stage $S_1$ at the point $R_2$, this associated valve is also completely closed. From then, the delivery pressure of the circulating pump exclusively acts on the temperature-control circuit of the last room, the temperature of which also reaches the stage $S_1$ at the point $R_3$ in a slope which is somewhat still steeper. Subsequently, all valves are completely opened again (i.e., the last valve remains open and the other valves are reopened) and the algorithm is continued in the same manner until one room temperature after another reaches the second temperature stage $S_2$. $R_1$, $R_2$, and $R_3$ again show the points at which the temperature of the fastest, the second-fastest, and the slowest rooms reach this temperature stage. It is also to be noted in this regard that $R_1$, $R_2$, and $R_3$ are not to be associated with fixed rooms, but rather the sequence in reaching the respective temperature stage. It is possible that the sequence can change in a following algorithm step with respect to individual rooms; however, it generally remains the same, as shown in FIG. 1 by the dashed lines. Reaching the third temperature stage $S_3$ also plays out according to the same pattern again in the algorithm. The slowest heating room is also always carried along from temperature stage to temperature stage in this manner so that the temperature difference between the fastest heating room and the slowest heating room is also kept as small as possible during the transition. The last step in FIG. 1 shows the approximately simultaneous reaching of the individual room temperature target values in the end state $T_E$ after reaching the temperature stage $S_3$ and the reopening of the valve. These target values could also be identical if the same temperature, i.e., the same end temperature level, is desired in all thermally supplied rooms. With reaching the room temperature target values, the algorithm of the method according to the invention has arrived at the goal, and a regulating phase follows in which the room temperatures are kept at the end temperature levels thereof, corresponding to the room temperature target values.

As a supplement to FIG. 1, it is also to be noted that if significantly lower room temperature target values were to apply for one room or multiple rooms, which therefore are already reached after an earlier temperature stage, these rooms would then simply be removed from the algorithm, and the algorithm according to the invention would be continued with the remaining rooms having higher room temperature target values until all room temperatures have reached the target value thereof.

Moreover, a classification of the two diagram axes was omitted in FIG. 1, because the temperature stages between $T_A$ and $T_E$ can be selected arbitrarily (the step size between the temperature stages does not have to be constant), and because the method is not dependent on a measurement of the time or of time intervals, but rather only on the state detection of the room temperatures with respect to the temperature stages and the end target values.

A surprisingly simple, alternative method can thus be provided by the present invention, using which the problem of poorly hydraulically and thermally supplied rooms during temperature transitions can be solved with comparatively little effort. In this manner, a slowly reacting room is also taken along step-by-step and without great delay to a new temperature level. A more remote room, for example, a room in a schoolhouse, also soon comes to a comfortable temperature upon heating.

The invention claimed is:

1. A method for heating or cooling rooms in a building having a temperature-control system, wherein the temperature-control system comprises:
   a) a central heat generator or cold generator having a combined circulation system having feed and return lines;
   b) a central circulating pump for the circulation of a temperature-control fluid in the combined circulation system;
   c) at least two heat exchanger units, which each thermally supply one room of the building, and which are each connected to the feed and return lines of the combined circulation system;
   d) one valve having actuating drive per heat exchanger unit;
   e) one room temperature sensor per thermally supplied room; and
   f) a central control and regulating unit, which is connected to the actuating drives of the valves and to the room temperature sensors;
   wherein a temperature transition is completed with the heating or cooling in the thermally supplied rooms in the building from a starting state to an end state different from the starting state having corresponding room temperature target values,
   characterized in that during the temperature transition, one proceeds according to at least two preselected temperature stages lying between the starting state and the end state according to the following algorithm:
   i) firstly all valves are completely opened by the central control and regulating unit;
   ii) as soon the temperature reported by the corresponding room temperature sensor has reached a first temperature stage in a room, the relevant valve is completely closed;
   iii) as soon this first temperature stage is also reached in a next room, this valve is also completely closed;
   iv) the procedure is continued with each further room until the first temperature stage is also reached in a last room;
   v) all valves are then completely opened again until a second temperature stage is reached in a room, whereupon the relevant valve is completely closed, and the same procedure is used until this second temperature stage is also reached in a last room;
   vi) all valves are completely opened again, and the algorithm is continued until all thermally supplied rooms have reached the room temperature target value thereof;
   vii) after reaching a room temperature target value, a regulating phase follows, in which the temperature in the relevant room is maintained by the central control and regulating unit at an end temperature level corresponding to the room temperature target value.

2. The method according to claim 1, characterized in that the temperature-control system is a heating system and/or a cooling system.

3. The method according to claim 1, characterized in that each heat exchanger unit comprises at least one heat exchanger, and the heat exchangers are temperature control elements through which a temperature-control fluid can flow.

4. The method according to claim 3, characterized in that the heat exchangers are selected from heating elements and/or cooling elements.

5. The method according to claim 3, characterized in that the heat exchangers are selected from radiators and underfloor heating systems.

6. The method according to claim 1, characterized in that the temperature-control fluid is a heat carrier medium, preferably water.

7. The method according to claim 1, characterized in that the temperature-control fluid is brought to a feed temperature suitable for heating or cooling by the central heat generator or cold generator.

8. The method according to claim 1, characterized in that at least three rooms of the building are thermally supplied by heat exchanger units.

9. The method according to claim 1, characterized in that the building is stationary or mobile.

10. The method according to claim 1, characterized in that the algorithm comprises at least three preselected temperature stages between the starting state and the end state, which is different therefrom.

11. The method according to claim 10, characterized in that a constant step size is selected between the temperature stages.

12. The method according to claim 11, characterized in that the step size is in the range of 0.1 to 1.0° C., preferably 0.5° C.

13. The method according to claim 1, characterized in that a next temperature stage in the algorithm is only undertaken when a specific temperature stage has been reached in all thermally supplied rooms.

* * * * *